Oct. 8, 1957

J. D. EISLER ET AL 2,808,894

SEISMIC WAVE GENERATION

Filed April 27, 1953

INVENTORS
JOSEPH D. EISLER
DANIEL SILVERMAN
BY Newell Pottoff
ATTORNEY

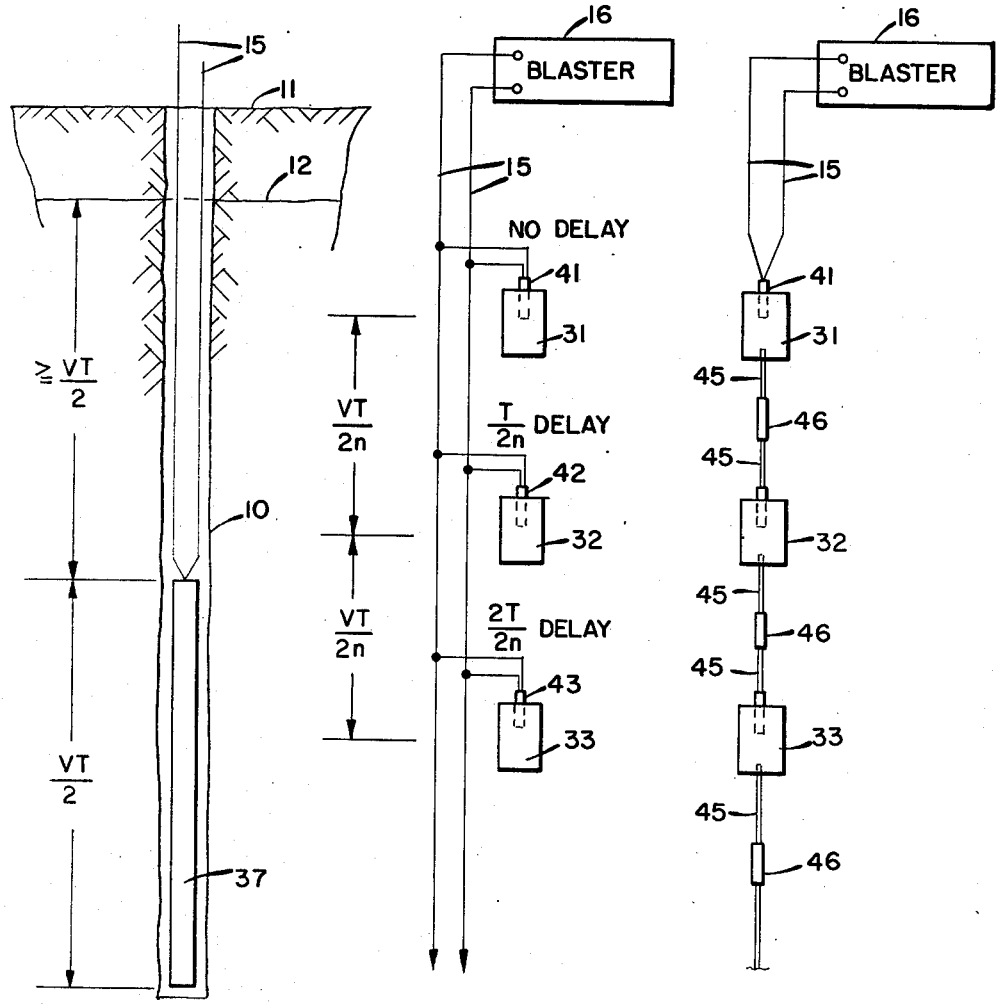

Oct. 8, 1957  J. D. EISLER ET AL  2,808,894
SEISMIC WAVE GENERATION
Filed April 27, 1953  4 Sheets-Sheet 4

INVENTORS
JOSEPH D. EISLER
DANIEL SILVERMAN
BY Newell Pottorf
ATTORNEY

United States Patent Office 2,808,894
Patented Oct. 8, 1957

2,808,894
SEISMIC WAVE GENERATION

Joseph D. Eisler and Daniel Silverman, Tulsa, Okla., assignors to Pan American Petroleum Corporation, a corporation of Delaware Application April 27, 1953, Serial No. 351,291

9 Claims. (Cl. 181—.5)

This invention relates to seismic geophysical surveying and is directed particularly to improvements in the generation of the desired seismic waves. More specifically, it is directed to reducing the relative amount of interfering energy, or conversely to increasing the proportion of the energy traveling along the desired paths.

In carrying on geophysical surveying by the seismic method it has been common practice for many years to create the desired seismic waves by the detonation of explosives. In many cases the detonation of a single charge of explosive in a bore hole is sufficient to produce the desired waves. On other occasions substantial improvement is noted if the explosive is subdivided into a plurality of vertically spaced charges, or is uniformly distributed throughout an appreciable vertical distance. In order to obtain satisfactory coupling between the explosive charge and the surrounding medium, the charge is usually placed in a high-velocity layer such as exists below the base of the so-called "weathered layer." Some success has been attained in utilizing the charge or charges in other ways, for example, as a pattern in the air above the ground surface; but the placing of the charge below weathering is still the most common practice at present.

Although substantial improvement has sometimes been noted when using a plurality of spaced charges, or a uniformly-distributed charge, as compared with the same weight of explosive material concentrated at or close to a single point, we have found, however, that the use of spaced and distributed charges does not always give the improvement sought. We have frequently noted that the character of the received waves varies with the positioning of the charge or charges. In particular, seismic records sometimes exhibit extraneous seismic energy which appears to have traveled by paths close to but not identical to the desired most direct path from the charge to a subsurface reflecting horizon and back to the seismic-wave receiver.

It is accordingly a primary object to provide a method of generating seismic waves by an improved arrangement of explosive. Another object is to provide an improvement in seismic-wave generation by an array of explosive charge material which reduces the amount of energy transmitted to the receiver by other than the desired paths. A further object is to provide a method of generating seismic waves by placing a charge or charges of explosive so as to avoid a substantial portion of the interference between waves traveling by different paths from the charge to the receiver. Still another object is to provide an improved arrangement of continuously distributed charge material to induce maximum self-cancellation of certain undesired seismic waves. A still further object is to provide an improvement in the utilization of a plurality of spaced charges which makes the useful energy a maximum. Other and further objects, uses, and advantages of the invention will become apparent as the description proceeds.

Stated briefly, the foregoing and other objects are accomplished by taking advantage of a discovery we have made that substantial amounts of energy propagating upwardly from an exploding charge may encounter a strongly-reflecting interface above the charge and then be transmitted downwardly, following by only a short time interval the normal desired energy which travels directly downwardly from the charge or charges. This once-reflected energy we shall call down-reflected energy or waves herein. In accordance with one embodiment of our invention, therefore, the charge or charges are so placed with reference to the overlying reflecting interface that the direct and the down-reflected energy are subsequently received at the detecting points with sufficient difference in arrival times so as not to overlap. In addition, in utilizing a distributed continuous charge or a plurality of spaced individual charges, advantage is taken of the well-known phenomenon of wave reinforcement by arranging the detonation-wave travel along the charge or charges to coincide with the travel of the desired seismic waves in the adjacent medium. Besides satisfying this velocity-matching condition, the charge or charges of our invention satisfy the still further criterion that the down-reflected waves themselves arrive at the receiving point so out of phase with each other as to produce a substantial cancellation of all but the initial and final portions of their wave trains.

This will be better understood by reference to the accompanying drawings forming a part of this application and illustrating certain embodiments and modifications of the invention. In these drawings, Figure 1 is a diagrammatic cross-section of the earth showing an embodiment of the invention and certain seismic wave paths with which it is concerned;

Figure 3 is a view similar to Figures 1 and 2 showing the application of the invention to a continuous charge;

Figures 4 and 5 are diagrammatic representations of alternative ways of achieving time delays between successive charge detonations;

Figure 1:
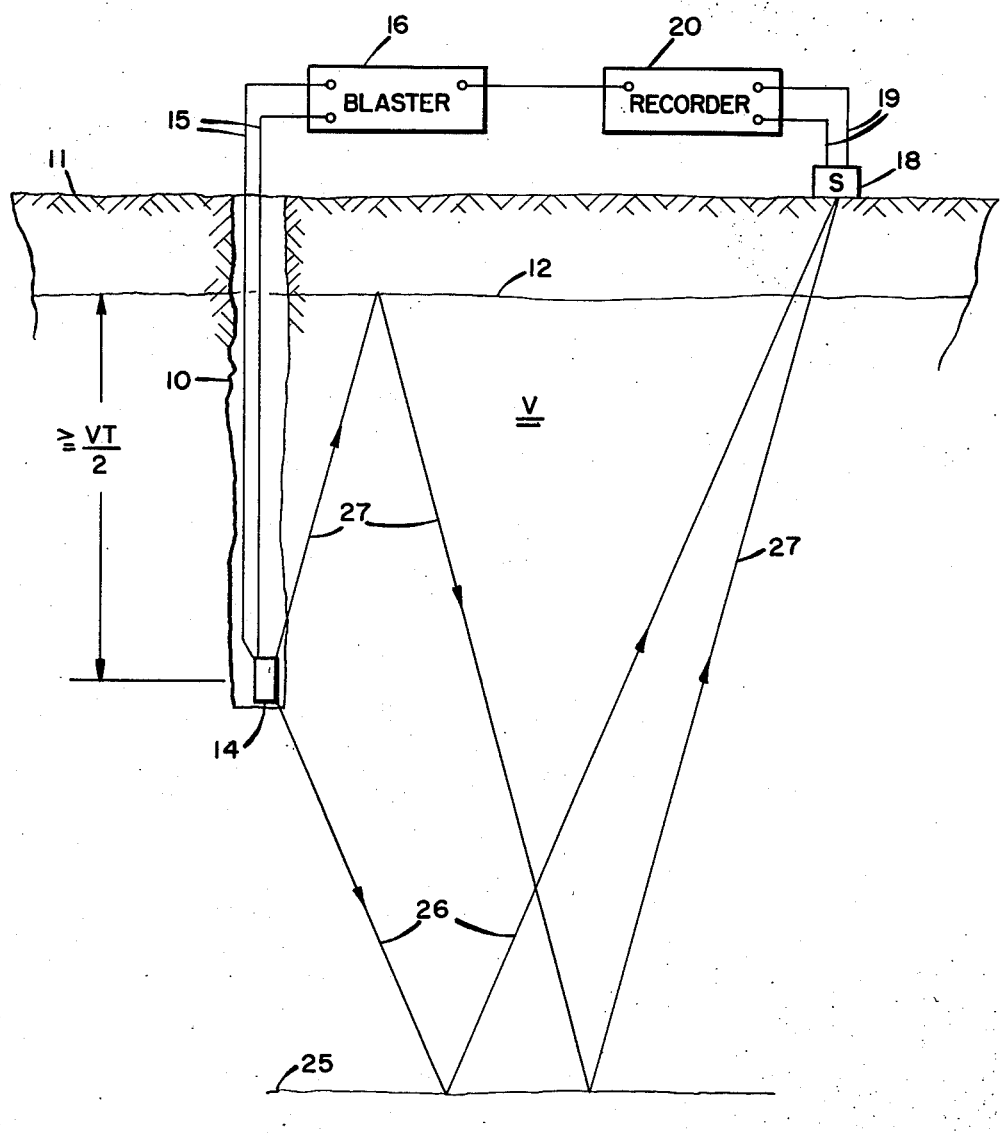

Referring now to these drawings in detail and particularly to Figure 1 thereof, a cross-section of the earth is shown diagrammatically, with a shot hole 10 extending from the earth's surface 11 to a substantial depth below a reflecting interface 12. For the purpose of generating seismic waves, a primed explosive charge 14 is positioned in shot hole 10 and connected by insulated firing leads 15 to a blasting device 16 at the surface 11. Also at surface 11, displaced at some horizontal distance from the top of hole 10, is a seismic-wave receiver or seismometer 18 connected through leads 19 to a recorder 20, all of which may be of conventional form, only one seismometer being shown for purposes of illustration.

As briefly suggested, we have discovered that the interface or boundary 12 has certain properties of interest in connection with this invention. When the charge 14 is detonated to create seismic waves, a portion of the energy normally travels by a direct path 26 to a reflecting interface 25 at some depth in the earth below the bottom of shot hole 10 and returns to the detector 18, whereupon it is recorded by the recorder 20. Some of the energy from charge 14 propagates upwardly, however, and it is a property of the boundary or interface 12 that this energy is strongly reflected in the same manner as the energy over path 26, finally arriving at the detector 18 a short time after the arrival of the direct energy over path 26. The path 27 is typical of that followed by such down-reflected energy, which is often almost as strong as the desired energy.

The interface 12 is frequently found to be at the base of the weathered layer, but is sometimes associated instead with the actual ground surface 11, or with some discontinuity either inside or below the normal weathered layer. Regardless of its location, however, the result of the reflection at boundary 12 is always to introduce more or less distortion into that portion of the energy arriving over the direct path 26 which it overlaps in time. Thus, while the initial portion of a pulse traveling by the path 26 may be satisfactorily received, the later portion of the pulse by which it can be more definitely identified may be highly distorted by interference with the secondary wave arriving over the indirect path 27.

It is accordingly an important aspect of our invention to place the charge 14 at such a depth below the interface 12 that the major portion of the energy traveling over the path 26 is received and recorded before that traveling over path 27 can arrive. This is accomplished in the manner illustrated in Figure 1, by making the depth of the charge 14 below interface 12 at least equal to or greater than the product $VT/2$, where $V$ is the average seismic compressional-wave velocity in the medium between the charge position 14 and the interface 12, and $T$ is the apparent period of the seismic waves as received at seismometer 18. There is thus assured a time interval at least as long as the period $T$ of the desired seismic wave before any arrival of energy over the path 27 is possible. In other words, the increase in length of path 27 and the decrease in length of path 26 due to placing the shot 14 at the depth $VT/2$ below interface provide a total difference in path length of at least $VT$, so that the time interval between the arrival of the initial phases of the direct and the down-reflected waves at the seismometer 18 is at least equal to $T$. Consequently, a full cycle of the wave traveling by the path 26 is received before any energy traveling over the path 27 appears.

Although it might be thought from the foregoing that reflection of seismic-wave energy from the interface 12 cannot be avoided under any conditions, experiments with distributed charges have shown this not to be the case. By the use of long, vertical, continuous charges, detonated from the upper end downwardly and having a velocity of detonation along the length of the charge material substantially equal to the seismic wave-propagation velocity in the surrounding earth medium, a considerable concentration of downward seismic energy is achieved, and a minimum amount of energy is reflected from interface such as 12 above the upper end of the elongated continuous charge.

Providing such continuous charges, having a detonation velocity matching the seismic-wave transmission velocity of the earth medium adjacent the bore hole, is often difficult, however, because many explosive compositions of the proper velocity will not detonate under bore-hole conditions, and most of those which will detonate under such conditions have detonation velocities much higher than the seismic-wave transmission velocities of most shallow earth media.

Nevertheless, in accordance with our invention, some of the desirable properties of the continuous charge as regards the minimizing of down-reflected waves are provided by a plurality of unit charges spaced along a bore hole and detonated in time sequence. If, for example, two charges are used, they are detonated in time sequence, the upper one first and the lower one second, and velocity matching is provided by making the time delay between the two charge detonations just equal to the time of travel of the seismic waves from the position of the first charge to the second charge position.

This time-delay condition, however, places no limitation on the spacing between the two charges. Therefore, in accordance with the present inventon, this spacing is so chosen as to produce a maximum of interference between the two down-reflected pulses from the two charges when these pulses arrive at the detector 18. Thus, the spacing between the two charges is so chosen that the two down-reflected waves arriving at the detector 18 are one-half wave period in time, or 180° in phase, apart. Likewise, for three charges, spacings are chosen to produce at detector 18 three waves separated by one-third period, or 120° in phase. In the general case, the spacing of $n$ charges is so chosen that the down-reflected waves arriving at detector 18 are $T/n$ apart in time, or $360°/n$ apart in phase.

Figure 2:
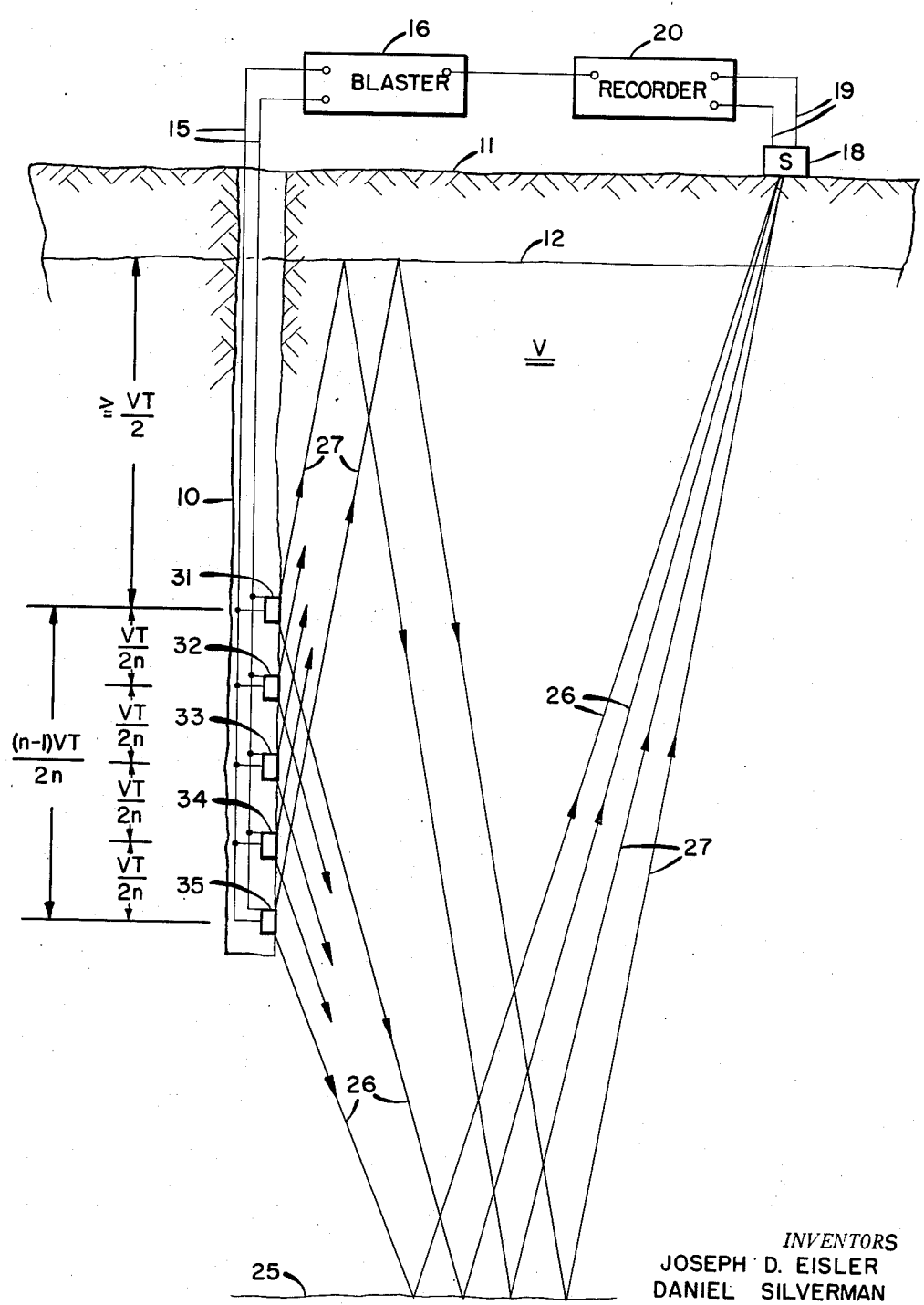
Figure 2 is a similar cross-section of the earth showing a preferred embodiment of the invention in position therein and the resultant wave paths.

This is illustrated in Figure 2. Thus, the multiple charge units 31, 32, 33, 34 and 35 are spaced along the bore hole 10 at separations of $VT/2n$. This results in a total length of array of $(n-1)VT/2n$. In the example shown, $n$ is, of course, equal to five, but it could be any other number greater than one.

In operation, charge 31 is detonated first by the impulse from blaster 16 applied over the detonating leads 15. Thereafter, charge 32 is detonated after a time delay of $T/2n$, following which charge 33 is detonated after a similar time delay of $T/2n$, and so on, down to charge 35. This results in each charge below charge 31 being detonated in synchronism with the downward movement of the seismic wave-front. Therefore, the direct waves traveling over the paths 26 are all in phase and remain so until they arrive in phase at the detector 18 with the effect of a single pulse. The spacing of $VT/2n$ between charge units, combined with the effect of the successive time delays, however, results in the waves traveling over the indirect paths 27 arriving at the detector 18 at time intervals of $T/n$ apart, thus producing maximum mutual interference.

If desired, the condition described in Figure 1 of making the depth to the upper charge 31 at least equal to or greater than $VT/2$ can also be applied to this charge array. This will assure that the uncanceled initial portion of the trains of down-reflected waves arriving over the path 27 will arrive at least one wave period $T$ after the direct waves traveling paths 26.

The foregoing considerations lead to some interesting results when $n$, the number of charges, becomes very large. It will be observed that the result is to make both the spacing $VT/2n$ between charges and also the time interval $T/2n$ between charge detonations, very small. Accordingly, such an array of very many charges approaches the true continuous charge 37 shown in Figure 3, and the expression for the total length $(n-1)VT/2n$ approaches as a limit the value $VT/2$. This distance is thus an optimum length for the continuous charge 37.

In addition to being of this length, it is understood that the velocity of detonation along the length of charge 37 is equal to the seismic-wave velocity $V$, and the further limitation, that the top end of the charge is located at least the distance $VT/2$ below the down-reflecting interface 12, may be applied. Insofar as the reflection of energy by interface 12 is concerned, lengths of charge 37 greater than $VT/2$ tend to produce energy which is in phase with that produced by the upper end of this charge, so that some reinforcement of the down-reflected waves may occur. Accordingly, in areas where such reflecting interfaces as 12 are prominent, $VT/2$ appears to be the most desirable length for a continuous seismic-velocity-matching charge 37.

There are several ways of providing the proper time delay between the detonation of the successive charges in an array of spaced charge units. One means for doing this is illustrated in Figure 4. In this embodiment, the leads 15 from the blaster 16 are connected to each of the detonators of the individual charges in parallel. The detonator 41 of the uppermost charge 31 of an array, is one which operates with zero time delay. The detonator 42 of the charge 32 therebelow is one which operates after a delay time of $T/2n$ following the application of the impulse from blaster 16. Similarly, the detonator 43 of the next charge 33 has twice the delay time of detonator 42, namely, $2T/2n$, and each successive detonator has an increased delay time of $T/2n$ over that of the charge thereabove, so that the result is a detonation of each successive charge at the time $T/2n$ after the detonation of the charge directly above. This maintains the propagation of the detonation from top to bottom of the charge array in step with the propagation of the seismic waves at velocity V through the surrounding earth medium even though the impulses from blaster 16 reaches all charge detonators simultaneously.

In Figure 5 is shown an alternative mechanism for providing the desired delay. Assuming the same spacing of the charges 31, 32, etc., the upper charge 31 is fired by an electric detonator 41 of zero time delay. Charge 32 is linked to charge 31 by a detonating fuse 45 such as Primacord into which is inserted, at some intermediate point, a delay element 46, which may be of the type described in Burrows et al. Patent 2,475,875. The propagation time along the Primacord 45, plus the delay time in the element 46 is, in all cases, made equal to the time $T/2n$, with the result that the over-all detonation velocity along the charge array is equal to the velocity V.

Still another way of providing for the proper delay time between charge detonations is that described in the application S. N. 324,193 filed December 5, 1952 by Harold M. Lang, wherein is disclosed a detonating device for each of the charge units of an array of charges, which device is sensitive to the arrival of the seismic-wave impulse from the previously detonated adjacent charge. With this detonating mechanism, the detonation velocity along the charge array is automatically matched to the seismic-wave velocity of the surrounding medium, regardless of the variations in this velocity or in the spacing between adjacent charges.

Figure 6:
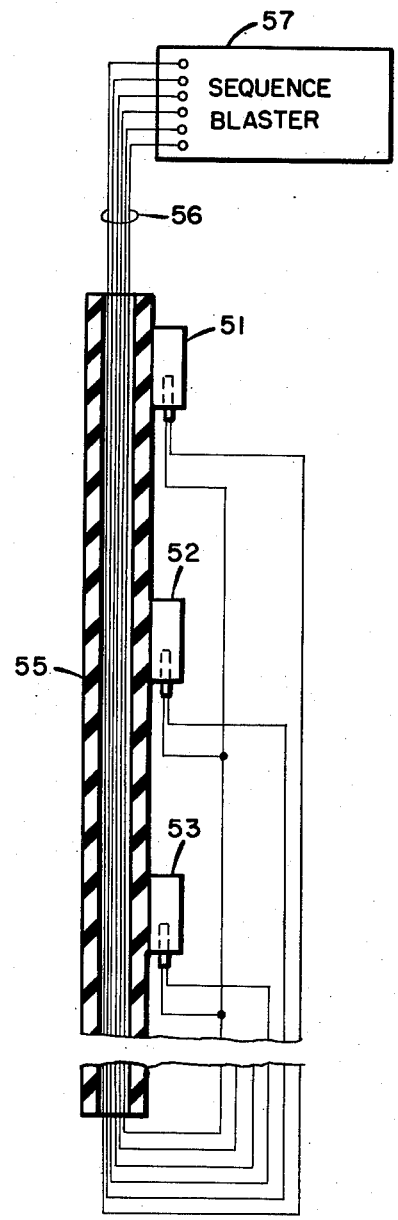
Figure 6 is a view partially diagrammatic and partially in cross-section of a further embodiment of the invention.

In Figure 6 is shown a still further embodiment of a charge array and time-sequence detonating means useful where relatively small-size charge units will suffice to provide the necessary energy. Thus, small individual charge units 51, 52, 53, etc., may be supported on the outside of a relatively thick-walled hose 55 and may be detonated there without either severing or seriously damaging the hose. Each of a plurality of detonating leads 56 extends from an individual terminal of a time-sequence blaster 57 through the hose 55 and to the appropriate one of the charge units 51, 52, 53, etc. The sequence blaster 57 may be of any conventional form such as the device shown in Figure 5 of McCollum Patent 1,899,970 which applies a detonating impulse over the proper one of leads 56 to detonate first the upper charge 51; then after the desired delay another impulse over another lead to detonate the next lower charge 52; then, after a further delay, charge 53, and so on. We have found that the resiliency of hose 55 gives it the ability to withstand a considerable amount of explosive force without breaking in two or permitting damage to the detonating leads 56 inside it. This, of course, is true only when the individual charges 51, 52, etc., are of fairly small size, so that if considerable energy or charge units of large size are needed, this arrangement is not suitable.

Figure 7:
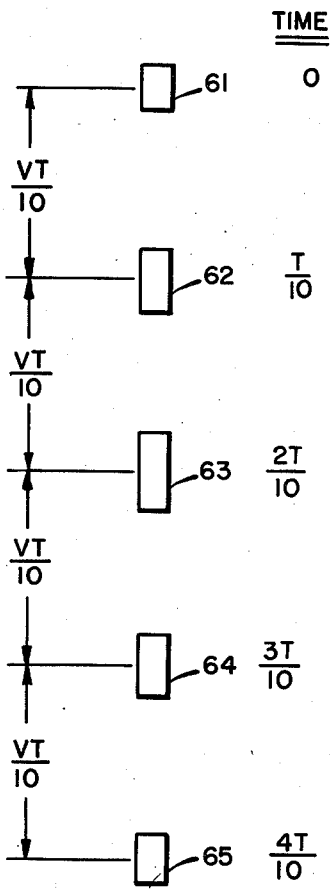
Figure 7 is a diagrammatic view of a charge array embodying the invention with improved cancellation of down-reflected wave energy.

Still further improvement in reducing the amplitude of the uncanceled portions of the down-reflected wave-trains of an array of charge units may be effected as shown in Figure 7. In this arrangement, the charges are tapered in size from each end of the array towards the middle of the plurality of $n$ charges, the largest charge or charges being in the middle of the array and the smallest ones at each end. Thus, upper charge 61 and bottom charge 65 of an array of five charges are relatively small, the charges 62 and 64 next to the end charges somewhat larger, while the center charge 63 is preferably the largest in size. As before, the charge spacing is $VT/2n$ or, in this case $VT/10$, where $n$ is five. As the previous embodiments, the delay time between charge detonations is $T/2n$, in this case $T/10$. This results in a total elapsed time of $4T/10$ between the detonations of charge 61 and charge 65. By this means the amplitudes of the initial and final portions of the down-reflected waves traveling over paths 27 are kept lower than they otherwise would be, at the expense of less effective cancellation of the mid-portion of these received wave trains.

In summary, therefore, our invention may be regarded as an improvement in the generation of seismic waves in which a plurality of $n$ charges are spaced uniformly through an interval $(n-1)VT/2$, which charges are detonated at equal time intervals through a length of time equal to $(n-1)T/2n$. In addition, the uppermost charge of the sequence, which is the one to be detonated first, is preferably positioned at a depth equal to or greater than $VT/2$ below an upper reflecting interface which produces sufficient down-reflection of energy to cause distortion of the desired direct waves by interfering with them, except for the increased difference in travel times due to the greater charge depth.

While the invention has been thus described in terms of specific examples and details, it is to be understood that other and further modifications will be apparent to those skilled in the art. The scope of the invention, therefore, should not be considered as limited to the details set forth but is to be ascertained from the appended claims.

We claim:

1. In the generation of seismic waves the improvement comprising placing in a bore hole a plurality of approximately equally vertically-spaced explosive charges below a strongly down-reflecting interface in the formations penetrated by said bore hole, the charge spacing being $VT/2n$ where V is the average seismic-wave velocity in the surrounding earth medium, T is the apparent period of the received seismic waves, and $n$ is the number of charge units, and detonating said charges in a downwardly progressive order, the time interval between the detonations each charge and the next lower charge being $T/2n$.

2. In the generation of seismic waves the improvement comprising placing a plurality of approximately equally-spaced explosive charges in a bore hole, the uppermost of said charges being placed below a strongly down-reflecting interface a distance at least as great as $VT/2$, and the charge spacing being approximately equal to $VT/2n$, where V is the average seismic-wave velocity in the surrounding earth medium, T is the apparent period of the seismic waves as received after travel through the earth to a receiving point, and $n$ is the number of charges, and detonating said charges in a downwardly progressive order, there being a time delay of $T/2n$ between the detonation of each charge and the next charge therebelow.

3. In the generation of seismic waves by detonating in a downwardly progressive order a plurality of $n$ explosive charges in a medium of seismic-wave velocity V to produce reflected seismic signal waves of apparent period T, the improvement comprising spacing said charges a distance $VT/2n$ apart, and delaying the detonation of each successive charge by a time interval $T/2n$ after the preceding charge detonation.

4. In the generation of seismic waves by the detonation in a downwardly progressive order of a plurality of $n$ charges in a medium of velocity V to produce signal waves of apparent period T, the improvement comprising spacing said charges uniformly through a vertical distance of $(n-1)VT/2n$ and detonating each charge a time interval $T/2n$ after the detonation of each preceding charge, the uppermost of said $n$ charges being detonated first.

5. The improvement in generating seismic waves according to claim 5 in which all of said charges are located a distance at least equal to $VT/2$ below an interface producing strong down-reflection of energy.

6. The improvement according to claim 4 in which said charges are graduated in size from each end of the array toward the middle, being largest at the middle.

7. Means for generating seismic waves of apparent period T in a medium of seismic-wave propagation velocity V comprising a plurality of $n$ charges spaced apart a distance substantially equal to $VT/2n$ along a vertical line, and means for detonating the uppermost of said charges first and each charge in succession thereafter with a time delay substantialy equal to $T/2n$ between the detonation of each charge and the adjacent charge therebelow.

8. Means for generating seismic waves of apparent period T in a medium of seismic-wave propagation velocity V comprising a plurality of $n$ charges spaced along a vertical line with separation intervals substantially equal to $VT/2n$ between adjacent charges, an electric detonator in the uppermost of said charges, and a detonating fuse including a time-delay element extending between each charge and the adjacent charge therebelow, said fuse and delay element being adapted to transmit a detonation impulse from each charge to the next one therebelow with a time delay of substantially $T/2n$.

9. In the generation of seismic waves of apparent period T in a medium of seismic-wave propagation velocity V, the improvement comprising placing in said medium an elongated vertical continuous charge of a length substantially equal to $VT/2$ and having a detonation velocity substantially equal to V, and detonating said elongated charge from the top end downwardly, said top end of said charge being positioned a distance at least equal to $VT/2$ below an interface producing strong down-reflection of energy.

References Cited in the file of this patent

UNITED STATES PATENTS

| | | |
|---|---|---|
| 2,064,451 | Voorhies | Dec. 15, 1936 |
| 2,087,702 | Peters | July 20, 1937 |
| 2,233,992 | Wyckoff | Mar. 4, 1941 |
| 2,384,851 | Reichert | Sept. 18, 1945 |
| 2,503,904 | Dahm | Apr. 11, 1950 |
| 2,556,299 | Scott | June 12, 1951 |
| 2,569,411 | Ellis | Sept. 25, 1951 |